United States Patent
Tsukerman et al.

(10) Patent No.: US 6,341,340 B1
(45) Date of Patent: Jan. 22, 2002

(54) TRANSITIONING OWNERSHIP OF DATA ITEMS BETWEEN OWNERSHIP GROUPS

(75) Inventors: Alex Tsukerman, Foster City; Gary C. Ngai, Saratoga; Gianfranco Putzolu, San Francisco; J. William Lee, Foster City, all of CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/222,593

(22) Filed: Dec. 28, 1998

(51) Int. Cl.[7] ............................................. G06F 12/00
(52) U.S. Cl. ..................................................... 711/150
(58) Field of Search .................................. 711/146, 150, 711/152, 151, 145

(56) References Cited

U.S. PATENT DOCUMENTS 5,490,261 A * 2/1996 Bean ........................... 711/130
5,860,137 A * 1/1999 Raz ............................. 711/202
6,128,762 A * 10/2000 Jadav .......................... 714/766

* cited by examiner

*Primary Examiner*—Matthew M. Kim
*Assistant Examiner*—C. P. Chace
(74) *Attorney, Agent, or Firm*—Hickman Palermo Truong & Becker, LLP; Brian D. Hickman; Van Mahamedi (57) ABSTRACT

A database or some portion thereof is partitioned into ownership groups. Each ownership group is assigned one or more database servers as owners of the ownership group. The database servers that are assigned as owners of an ownership group are treated as the owners of all data items that belong to the ownership group. That is, they are allowed to directly access the data items within the ownership group, while other database servers are not allowed to directly access those data items. A mechanism is provided for transitioning ownership of a data item. Ownership is transferred by disabling access to the data item, waiting for all transactions that have made changes to the data item to either commit or abort, changing data that indicates ownership of the data item from a first owner to a second owner, and enabling access to the data item.

24 Claims, 5 Drawing Sheets

TRANSITIONING OWNERSHIP OF DATA ITEMS BETWEEN OWNERSHIP GROUPS

FIELD OF THE INVENTION

The present invention relates to database systems and, more particularly, to a hybrid shared nothing/shared disk database system.

BACKGROUND OF THE INVENTION

Multi-processing computer systems are systems that include multiple processing units that are able to execute instructions in parallel relative to each other. To take advantage of parallel processing capabilities, different aspects of a task may be assigned to different processing units. The different aspects of a task are referred to herein as work granules, and the process responsible for distributing the work granules among the available processing units is referred to as a coordinator process.

Multi-processing computer systems typically fall into three categories: shared everything systems, shared disk systems, and shared nothing systems. The constraints placed on the distribution of work to processes performing granules of work vary based on the type of multi-processing system involved.

In shared everything systems, processes on all processors have direct access to all dynamic memory devices (hereinafter generally referred to as "memory") and to all static memory devices (hereinafter generally referred to as "disks") in the system. Consequently, in a shared everything system there are few constraints with respect to how work granules may be assigned. However, a high degree of wiring between the various computer components is required to provide shared everything functionality. In addition, there are scalability limits to shared everything architectures.

In shared disk systems, processors and memories are grouped into nodes. Each node in a shared disk system may itself constitute a shared everything system that includes multiple processors and multiple memories. Processes on all processors can access all disks in the system, but only the processes on processors that belong to a particular node can directly access the memory within the particular node. Shared disk systems generally require less wiring than shared everything systems. However, shared disk systems are more susceptible to unbalanced workload conditions. For example, if a node has a process that is working on a work granule that requires large amounts of dynamic memory, the memory that belongs to the node may not be large enough to simultaneously store all required data. Consequently, the process may have to swap data into and out of its node's local memory even though large amounts of memory remain available and unused in other nodes.

Shared disk systems provide compartmentalization of software failures resulting in memory corruption. The only exceptions are the control blocks used by the inter-node lock manager, that are virtually replicated in all nodes.

In shared nothing systems, all processors, memories and disks are grouped into nodes. In shared nothing systems as in shared disk systems, each node may itself constitute a shared everything system or a shared disk system. Only the processes running on a particular node can directly access the memories and disks within the particular node. Of the three general types of multi-processing systems, shared nothing systems typically require the least amount of wiring between the various system components. However, shared nothing systems are the most susceptible to unbalanced workload conditions. For example, all of the data to be accessed during a particular work granule may reside on the disks of a particular node. Consequently, only processes running within that node can be used to perform the work granule, even though processes on other nodes remain idle.

Shared nothing systems provide compartmentalization of software failures resulting in memory and/or disk corruption. The only exceptions are the control blocks controlling "ownership" of data subsets by different nodes. Ownership is much more rarely modified than shared disk lock management information. Hence, the ownership techniques are simpler and more reliable than the shared disk lock management techniques, because they do not have high performance requirements.

Databases that run on multi-processing systems typically fall into two categories: shared disk databases and shared nothing databases. Shared disk database systems in which multiple database servers (typically running on different nodes) are capable of reading and writing to any part of the database. Data access in the shared disk architecture is coordinated via a distributed lock manager. Shared disk databases may be run on both shared nothing and shared disk computer systems. To run a shared disk database on a shared nothing computer system, software support may be added to the operating system or additional hardware may be provided to allow processes to have direct access to remote disks.

A shared nothing database assumes that a process can only directly access data if the data is contained on a disk that belongs to the same node as the process. Specifically, the database data is subdivided among the available database servers. Each database server can directly read and write only the portion of data owned by that database server. If a first server seeks to access data owned by a second server, then the first database server must send messages to the second database server to cause the second database server to perform the data access on its behalf.

Shared nothing databases may be run on both shared disk and shared nothing multi-processing systems. To run a shared nothing database on a shared disk machine, a software mechanism may be provided for logically partitioning the database, and assigning ownership of each partition to a particular node.

Shared nothing and shared disk systems each have favorable advantages associated with its particular architecture. For example, shared nothing databases provide better performance if there are frequent write accesses (write hot spots) to the data. Shared disk databases provide better performance if there are frequent read accesses (read hot spots). Also, as mentioned above, shared nothing systems provide better fault containment in the presence of software failures.

In light of the foregoing, it would be desirable to provide a single database system that is able to provide the performance advantages of both types of database architectures. Typically, however, these two types of architectures are mutually exclusive.

SUMMARY OF THE INVENTION

According to one aspect of the invention, a method is provided for transitioning ownership of a data item. Ownership is transferred by disabling access to the data item, waiting for all transactions that have made changes to the data item to either commit or abort, changing data that indicates ownership of the data item from a first owner to a second owner, and enabling access to the data item.

Ownership groups are provided to establish sets of commonly owned data items. When a data item undergoing an ownership change belongs to an ownership group initially owned by the first owner, the step of changing data that indicates ownership of the data item from a first owner to a second owner may be accomplished by changing the owner of the ownership group from the first owner to the second owner, or may be accomplished by changing data that indicates the ownership group to which the data item belongs to reflect that the data item belongs to a second ownership group owned by the second owner.

The process performing the ownership transition may fail. According to one aspect of the invention, where the transition involves changing the owner of an ownership group, the system responds to such failure by determining whether the process failed before changing the data that indicates ownership of the ownership group. If the process failed before changing the data that indicates ownership of the ownership group, then the first owner is restored as owner of the ownership group. If the process failed after changing the data that indicates ownership of the ownership group, then the second owner is retained as owner of the ownership group.

When the transition involves changing the ownership group to which the data item belongs, removing the data item from its current ownership group involves updating a first file, and adding the data item to the new ownership group involves updating a second file. Failure of a process that is performing the ownership transition is responded to by determining whether the process performing the ownership transition died before the change to the second file. If the process performing the ownership transition died before the change to the second file, then the data item is restored as a member of the first ownership group. If the process performing the ownership transition died after the change to the second file but before the change to the first file, then the transition to the second ownership group is completed by updating the first file.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for providing a hybrid shared disk/shared nothing database system is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 1:
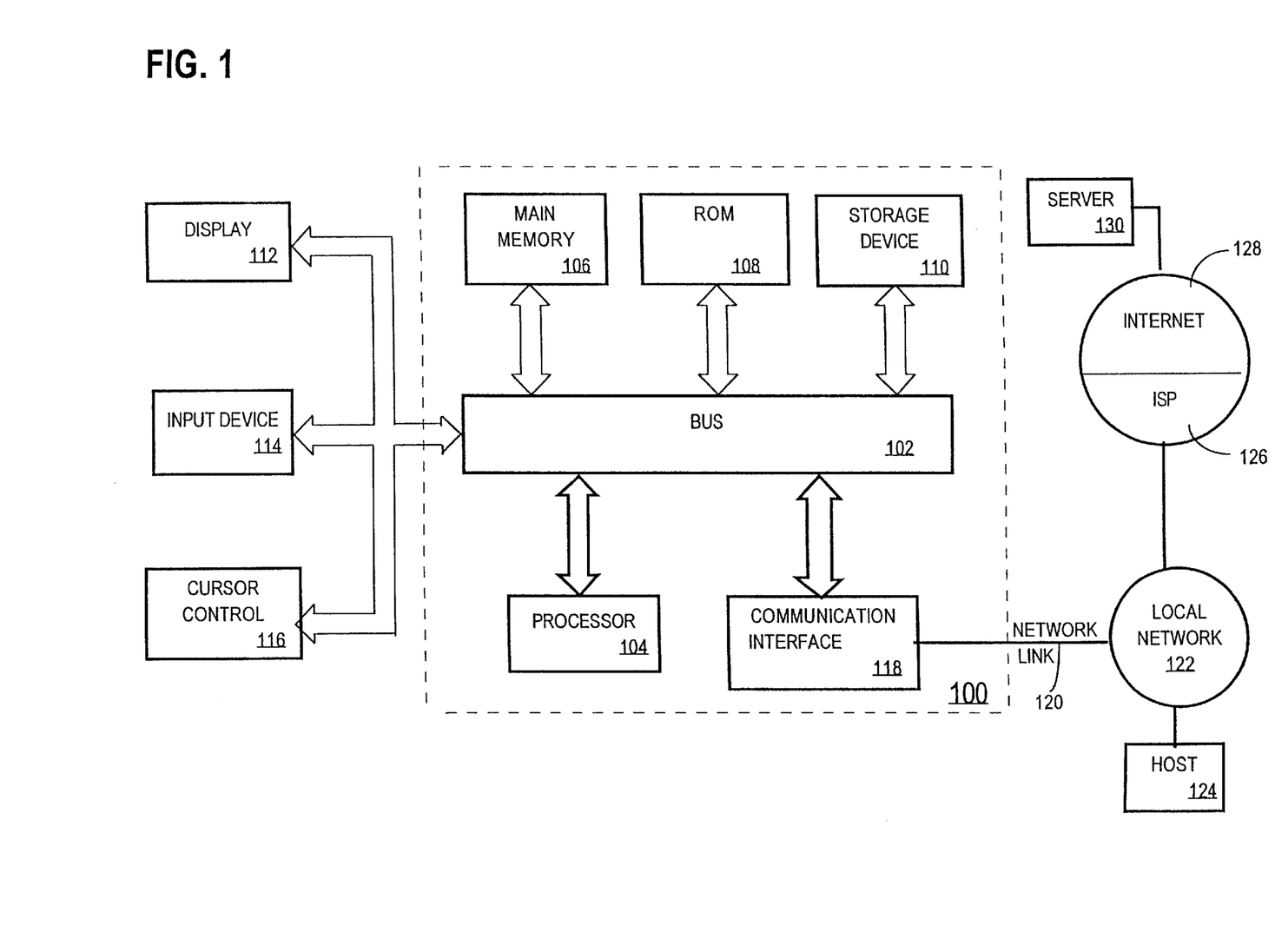
FIG. 1 is a block diagram of a computer system on which an embodiment of the invention may be implemented.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for providing a hybrid shared disk/shared nothing database system. According to one embodiment of the invention, such a database system is provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. In accordance with the invention, one such downloaded application provides for a hybrid shared disk/shared nothing database system as described herein.

The received code may be executed by processor 104 as it is received, and/or stored in storage device 110, or other non-volatile storage for later execution. In this manner, computer system 100 may obtain application code in the form of a carrier wave.

The hybrid shared disk/shared nothing database system described herein is implemented on a computer system for which shared disk access to all disks is provided from all nodes, i.e. is a system that could be used for strictly shared disk access, although according to one aspect of the invention, access to some "shared nothing" disk data is restricted by the software.

Ownership Groups

According to an embodiment of the invention, a database (or some portion thereof) is partitioned into ownership groups. Each ownership group is assigned one or more database servers as owners of the ownership group. The database servers that are assigned as owners of an ownership group are treated as the owners of all data items that belong to the ownership group. That is, they are allowed to directly access the data items within the ownership group, while other database servers are not allowed to directly access those data items.

According to one embodiment, data items that are frequently accessed together are grouped into the same ownership group, thus ensuring that they will be owned by the same database servers. Ownership groups allow operations to be performed on a group of related data items by treating the group of related data items as an atomic unit. For example, ownership of all data items within an ownership group may be transferred from a first database server to a second database server by transferring ownership of the ownership group from the first database server to the second database server.

Hybrid Database System

Figure 2:
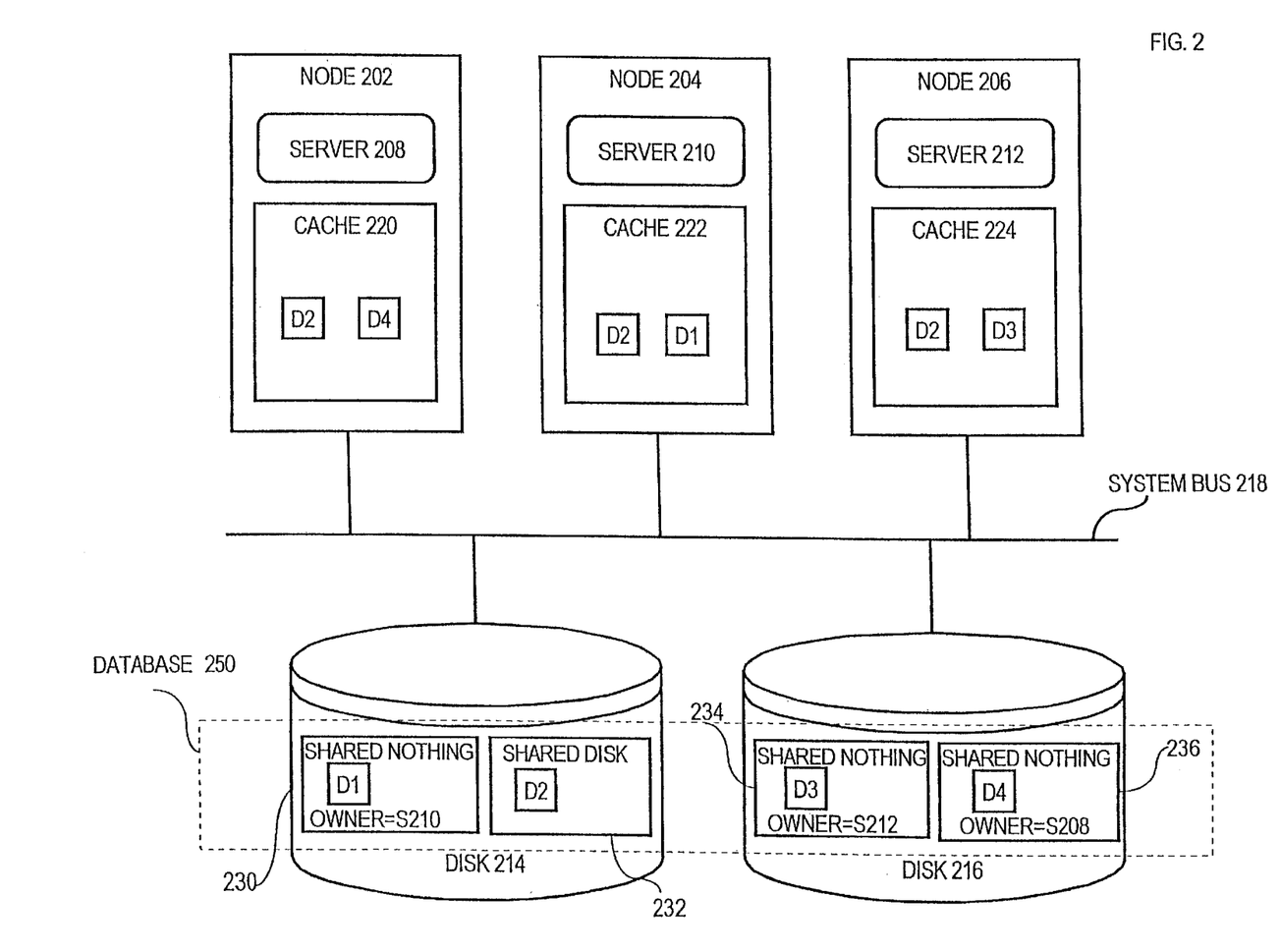
FIG. 2 is a block diagram of a distributed database system that uses ownership groups according to an embodiment of the invention.

FIG. 2 is a block diagram that depicts a hybrid database system architecture according to an embodiment of the invention. FIG. 2 includes three nodes 202, 204 and 206 on which are executing three database servers 208, 210 and 212, respectively. Database servers 208, 210 and 212 are respectively associated with buffer caches 220, 222 and 224. Each of nodes 202, 204 and 206 are connected to a system bus 218 that allows database servers 208, 210 and 212 to directly access data within a database 250 that resides on two disks 214 and 216.

The data contained on disks 214 and 216 is logically partitioned into ownership groups 230, 232, 234 and 236. According to an embodiment of the invention, each ownership group includes one or more tablespaces. A tablespace is a collection of one or more datafiles. However, the invention is not limited to any particular granularity of partitioning, and may be used with ownership groups of greater or lesser scope.

According to one embodiment, each ownership group is designated as a shared disk ownership group or a shared nothing ownership group. Each ownership group that is designated as a shared nothing ownership group is assigned one of the available database servers as its owner. In the system illustrated in FIG. 2, ownership group 230 is a shared nothing ownership group owned by server 210, ownership group 232 is a shared disk ownership group, ownership group 234 is a shared nothing ownership group owned by server 212, and ownership group 236 is a shared nothing ownership group owned by server 208.

Because ownership group 230 is a shared nothing ownership group owned by server 210, only server 210 is allowed to directly access data (D1) within ownership group 230. Any other server that seeks to access data in ownership group 230 is normally required to send message requests to server 210 that request server 210 to perform the desired data access on the requesting server's behalf. Likewise, ownership groups 234 and 236 are also shared nothing ownership groups, and may only be directly accessed by their respective owners.

Since ownership group 232 is a shared disk ownership group, any database server may directly access the set of data contained therein. As shown in FIG. 2, each database server may contain a copy of this data (D2) within its buffer cache. A distributed lock manager is employed to coordinate access to the shared data.

According to one embodiment, the database system includes a mechanism to dynamically change a particular ownership group from shared disk to shared nothing, and visa versa. For example, if a particular set of shared nothing data is subject to frequent read accesses (read hot spots), then that data can be converted to shared disk by converting the ownership group to which it belongs from shared nothing to shared disk. Likewise, if a particular set of shared disk data is subject to frequent write accesses (write hot spots), then that data can be converted to shared nothing data by changing the ownership group that contains the data to a shared nothing ownership group and assigning ownership of the ownership group to a database server.

According to one aspect of the invention, the database system also includes a mechanism to reassign ownership of a shared nothing ownership group from one node to another node. This may be requested by an operator to improve load balancing, or may happen automatically to continue to support access to the data of a shared nothing ownership group owned by a node N1 after N1 fails.

Ownership

As described above, a database system is provided in which some ownership groups are designated as shared nothing ownership groups, and some ownership groups are designated as shared disk ownership groups. An owner is assigned to every shared nothing ownership group. The ownership of a shared nothing ownership group is made known to all database servers so that they can send requests to the owner of the ownership group when they require tasks performed on data within the ownership group.

According to one embodiment of the invention, ownership information for the various ownership groups is maintained in a control file, and all database servers that have access to the database are allowed to access the control file. Each database server may store a copy of the control file in its cache. With a copy of the control file in its cache, a database server may determine the ownership of ownership groups without always having to incur the overhead associated with reading the ownership information from disk.

Figure 3:
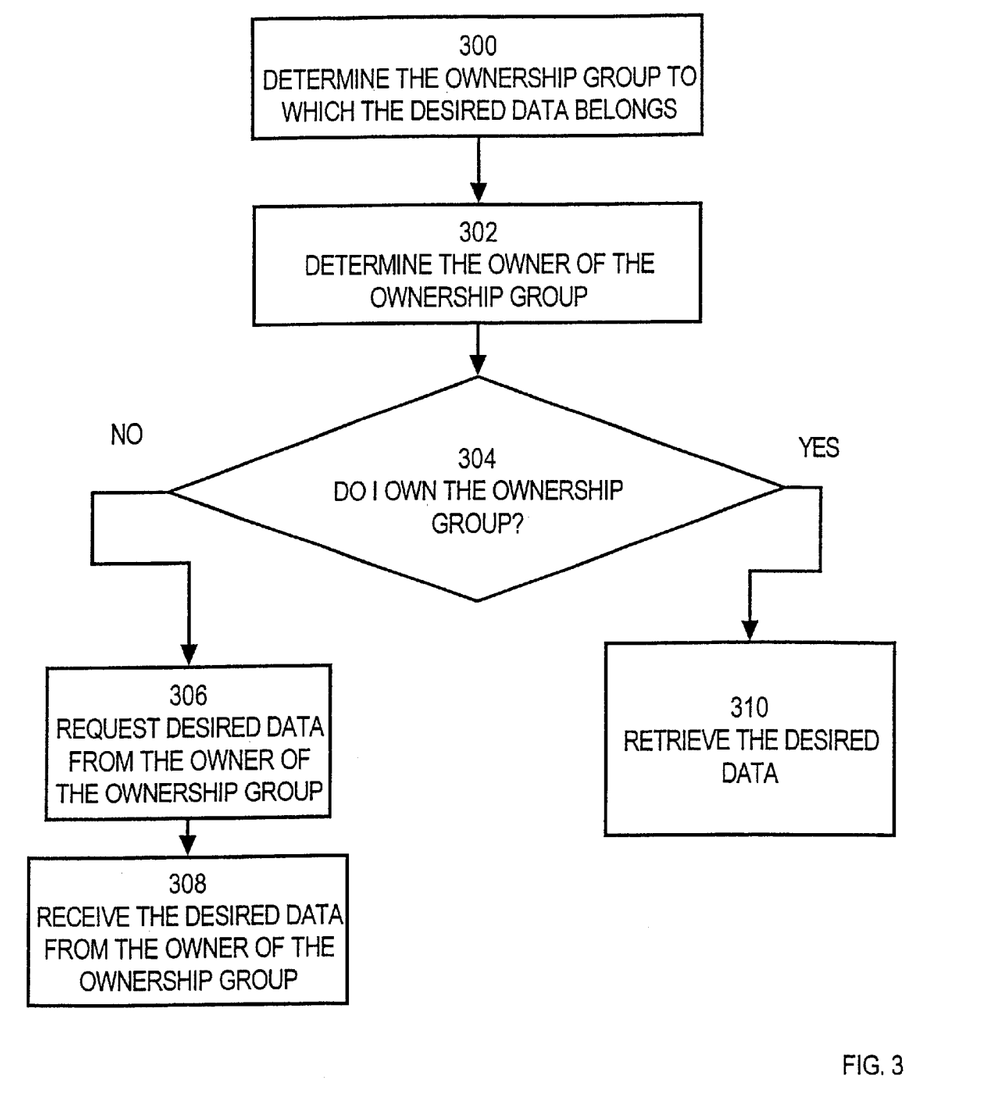
FIG. 3 is a flowchart illustrating steps for performing an operation on a data item in a system that supports ownership groups.

FIG. 3 is a flowchart illustrating the steps performed by a database server that desires data in a system that employs both shared disk and shared nothing ownership groups. In step 300, the database server determines the ownership group to which the desired data belongs. In step 302, the database server determines the owner of the ownership group that contains the desired data. As explained above, step 302 may be performed by accessing a control file, a copy of which may be stored in the cache associated with the database server. If the ownership group is a shared disk ownership group, then all database servers are considered to be owners of the ownership group. If the ownership group is a shared nothing ownership group, then a specific database server will be specified in the control file as the owner of the ownership group.

In step 304, the database server determines whether it is the owner of the ownership group that holds the desired data. The database server will be the owner of the ownership group if either (1) the ownership group is a shared disk ownership group, or (2) the ownership group is a shared nothing ownership group and the database server is designated in the control file as the owner of the shared nothing ownership group. If the database server is the owner of the ownership group that holds the desired data, control passes to step 310, where the database server directly retrieves the desired data.

If the database server is not the owner of the ownership group that holds the data, control passes to step 306. At step 306, the database server sends a request to the owner of the ownership group for the owner to access the desired data on behalf of the requestor. At step 308, the database server receives the desired data from the owner of the ownership group.

Owner Sets

According to an alternative embodiment, an ownership group is not limited to being either (1) owned by only one database server (shared nothing) or (2) owned by all database servers (shared disk). Rather, a ownership group may alternatively be owned by any specified subset of the available database servers. The set of database servers that own a particular ownership group are referred to herein as the owner set for the ownership group. Thus, a shared nothing ownership group is equivalent to a ownership group that includes only one database server in its owner set, while a shared disk ownership group is equivalent to a ownership group that includes all available database servers in its owner set.

When owner sets are used, to perform a task on data in an ownership group, a database server that does not belong to the owner set of the ownership group sends a request to one of the database servers that belong to the owner set of the ownership group. In response to the request, the recipient of the request directly accesses the data in the ownership group and performs the requested task. Contention caused by write hot spots within the ownership group only occurs among the database servers that belong to the owner set of the ownership group.

Changing the Ownership of an Ownership Group

As mentioned above, it may be desirable to change an ownership group from shared nothing to shared disk, or from shared disk to shared nothing. Such changes may be initiated automatically in response to the detection of read or write hot spots, or manually (e.g. in response to a command issued by a database administrator).

Figure 4:
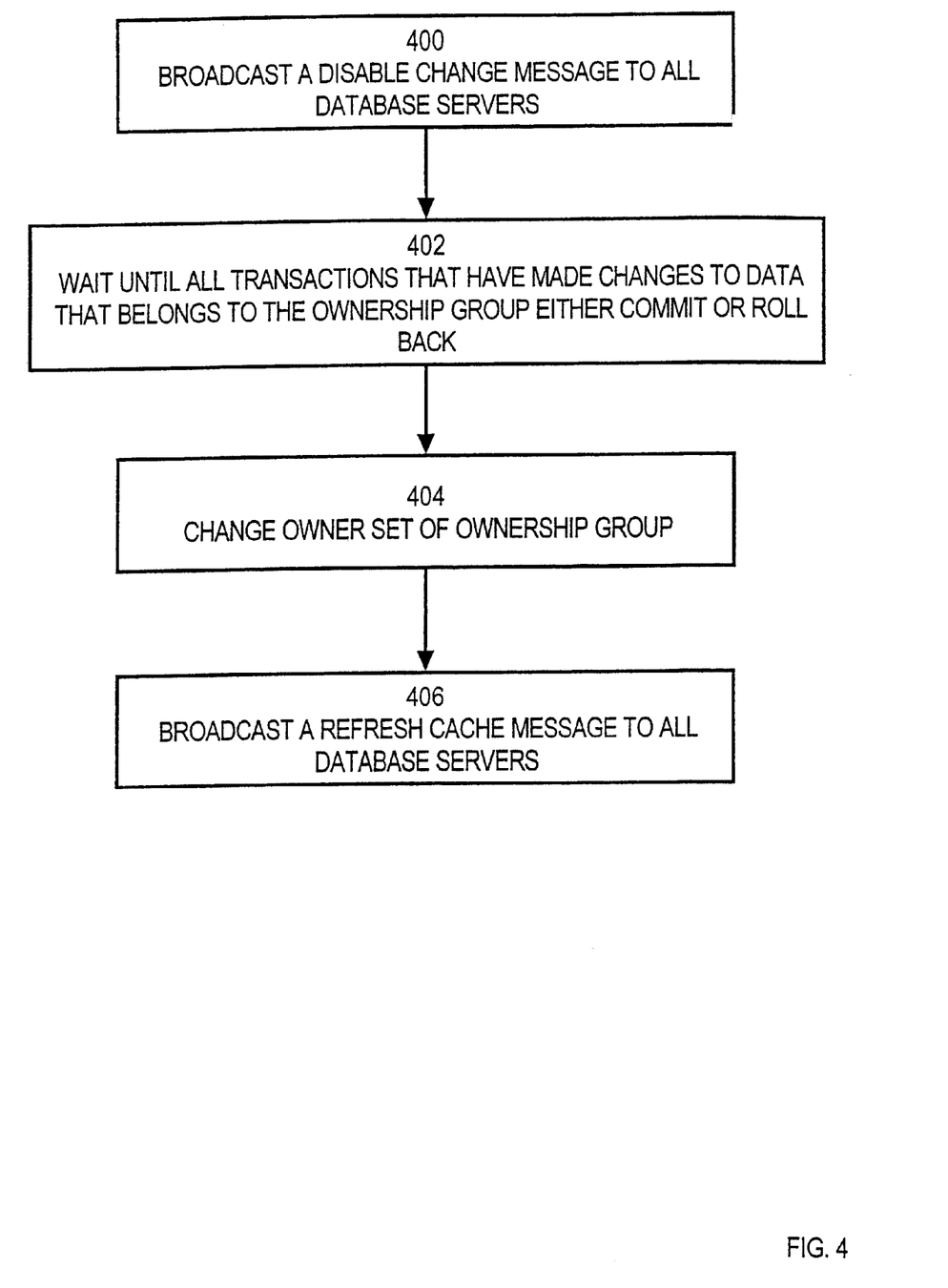
FIG. 4 is a flowchart illustrating steps for changing the owner set of an ownership group according to an embodiment of the invention.

Various techniques may be used to transition an ownership group from one owner set (the "source owner set") to the other (the "destination owner set"). FIG. 4 is a flowchart that illustrates steps performed for changing the owner set of an ownership group according to one embodiment of the invention.

Referring to FIG. 4, at step 400 a "disable change" message is broadcast to all of the available database servers. The disable change message instructs the database servers to cease making forward changes to data within the ownership group whose owner set is going to be changed (the "transitioning ownership group"). Forward changes are changes that create a version that has previously not existed (i.e. create a new "current" version of a data item). Backward changes, on the other hand, are changes that result in the re-creation of a previously existing version of a data item.

At step 402, the portion of the database system responsible for changing the owner set of ownership groups (the "owner changing mechanism") waits until all transactions that have made changes to the transitioning ownership group either commit or roll back. Those transactions that have performed some but not all of their updates to data within the transitioning ownership group prior to step 400 will roll back because forward changes to the ownership group are no longer allowed. Because step 400 prevents only forward changes to the transitioning ownership group, database servers are not prevented from rolling back the changes that they have already made to the transitioning ownership group.

Unfortunately, a significant amount of overhead may be required to determine which transactions have updated the transitioning ownership group. Therefore, an embodiment of the invention is provided in which the database system does not attempt to track the transactions that have updated data within the transitioning ownership group. However, without tracking this information, it must be assumed that any of the transactions that were allowed to access data in the transitioning ownership group and that were begun prior to step 400 may have made changes to data within the transitioning ownership group.

Based on this assumption, step 402 requires the owner changing mechanism to wait until all of the transactions that (1) may have possibly accessed data in the transitioning ownership group, and (2) were begun prior to step 400 either commit or roll back. Typically, only transactions that are executing in database servers that belong to the source owner set of the transitioning ownership group may have possibly accessed data in the transitioning ownership group. Thus, if the transitioning ownership group is shared disk, then the owner changing mechanism must wait until all transactions in all database servers that were begun prior to step 400 either commit or roll back. If the transitioning ownership group is shared nothing, then the owner changing mechanism must wait until all transactions in the database server that owns the transitioning ownership group either commit or roll back. Note that this includes user transactions that may have originated in other nodes, and have created subtransactions local to the transitioning ownership group.

When all transactions that could possibly have updated data within the transitioning ownership group have either committed or aborted, control proceeds to step 404. At step 404, the owner changing mechanism changes the owner set of the transitioning ownership group by updating the control file in an atomic operation. For example, the designation change may cause the transitioning ownership group to transition from a shared nothing ownership group to a shared disk ownership group or visa versa. Alternatively, the designation change may simply change the database server that owns a shared nothing ownership group, without changing the ownership group type.

After the control file has been changed to reflect the new owner set of the transitioning ownership group, control proceeds to step 406. At step 406, a "refresh cache" message is sent to all available database servers. Upon receiving the refresh cache message, each database server invalidates the copy of the control file that it contains in its cache. Consequently, when the database servers subsequently need to inspect the control file to determine ownership of an ownership group, they retrieve the updated version of the control file from persistent storage. Thus they are made aware of the new owner set of the transitioning ownership group.

Adjusting to Ownership Changes

When a particular query is going to be used frequently, the query is typically stored within the database. Most database systems generate an execution plan for a stored query at the time that the stored query is initially submitted to the database system, rather than recomputing an execution plan every time the stored query is used. The execution plan of a query must take into account the ownership of the ownership groups that contain the data accessed by the query. For example, if the query specifies an update to a data item in ownership group owned exclusively by a particular database server, the execution plan of the query must include shipping that update operation to that particular database server.

However, as explained above, a mechanism is provided for changing the ownership of ownership groups. Such ownership changes may take place after the execution plan for a particular stored query has been generated. As a consequence, execution plans may require certain database servers to perform operations on data within ownership groups that they no longer own. According to one embodiment of the invention, database servers that are asked to perform operations on data within ownership groups that they do not own return an "ownership error" message to the processes that request the operations. In response to receiving an ownership error message, a new execution plan is generated for the query that caused the error. The new execution plan takes into account the current ownership of ownership groups, as indicated by the current version of the control file.

Control File Management

Figure 5:
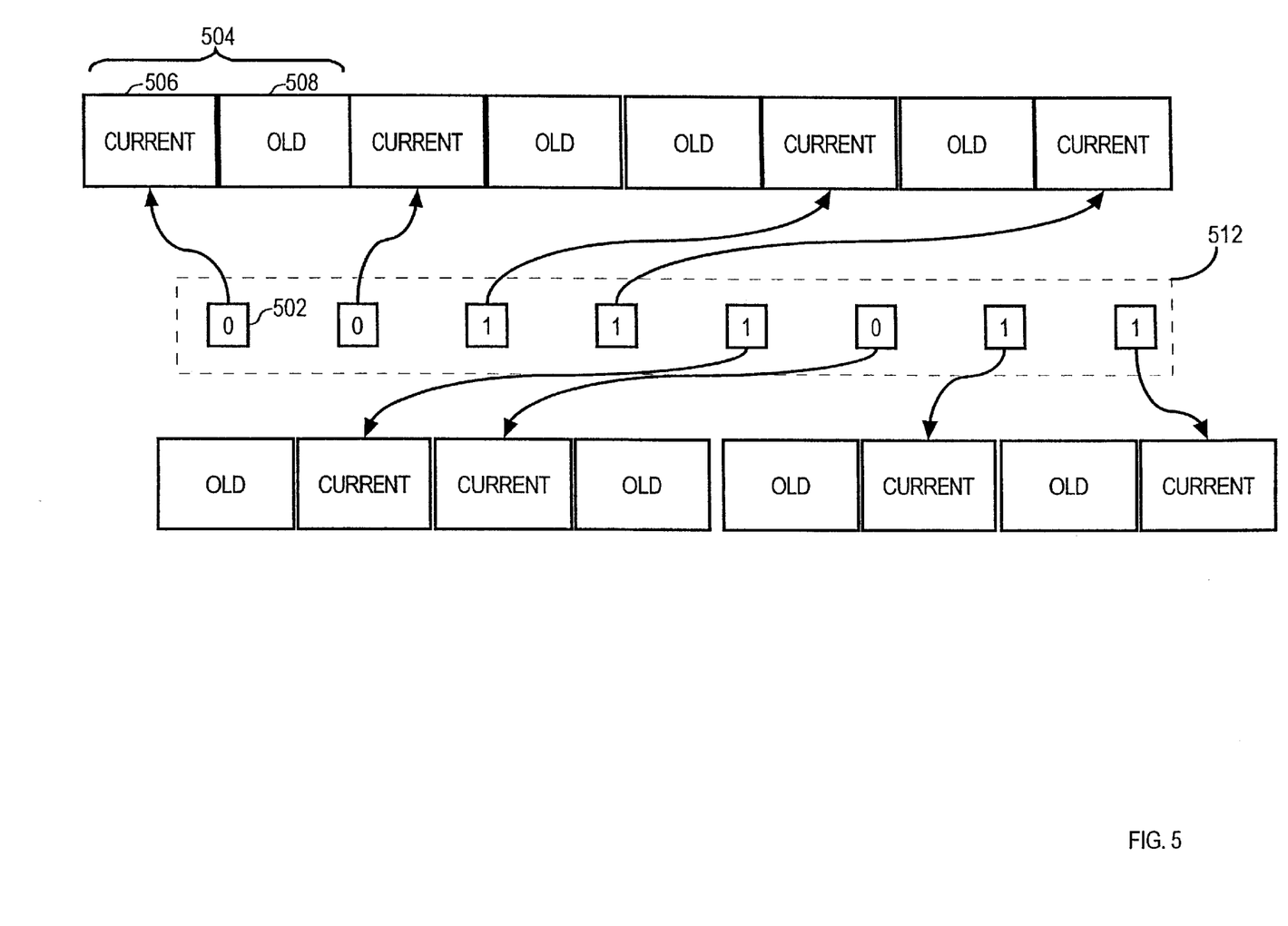
FIG. 5 is a block diagram that illustrates a technique for making an atomic change according to an embodiment of the invention.

As described above, an atomic operation is used to update the control file to change the designation of an ownership group (step 404). Various mechanisms may be used to ensure that this operation is atomic. For example, according to one embodiment of the invention, the control file includes a bitmap and a series of block pairs, as illustrated in FIG. 5. Each bit in the bitmap 512 corresponds to a block pair.

At any given time, only one of the blocks in a block pair contains current data. The value of the bit associated with a block pair indicates which of the two blocks in the corresponding block pair holds the current data. For example, bit 502 is associated with block pair 504 that includes blocks 506 and 508. The value of bit 502 (e.g. "0") indicates that block 506 is the current block within block pair 504. The value of bit 502 may be changed to "1" to indicate that the data in block 508 is current (and consequently that the data in block 506 is no longer valid).

Because the data in the non-current block of a block pair is considered invalid, data may be written into the non-current block without changing the effective contents of the control file. The contents of the control file are effectively changed only when the value of a bit in the bitmap 512 is changed. Thus, as preliminary steps to an atomic change, the contents of the current block 506 of a block pair 504 may be loaded into memory, modified, and stored into the non-current block 508 of the block pair 504. After these preliminary steps have been performed, the change can be atomically made by changing the value of the bit 502 within the bitmap 512 that corresponds to the block pair 504.

This is merely one example of a technique for performing changes atomically. Other techniques are possible. Thus, the present invention is not limited to any particular technique for performing changes atomically.

Moving Data Items Between Ownership Groups

One way to change ownership of a data item, such as a tablespace, is to change the owner set of the ownership group to which the data item belongs. A second way to change ownership of a data item is to reassign the data item to a different ownership group. For example, the owner of tablespace A can be changed from server A to server B by removing tablespace A from an ownership group assigned to server A and placing it in an ownership group assigned to server B.

According to one embodiment of the invention, the membership of ownership groups is maintained in a data dictionary within the database. Consequently, to move a data item from a first ownership group to a second ownership group, the membership information for both the first and second ownership groups have to be updated within the data dictionary. The various steps involved in changing to which ownership group a data item belongs are similar to those described above for changing the owner set of an ownership group. Specifically, access to the tablespace that is being transferred (the "transitioning tablespace") is disabled. The ownership change mechanism then waits for all transactions that hold locks on the data item (or a component thereof) to either roll back or commit.

Once all of the transactions that hold locks on the data item have either committed or rolled back, the data dictionary is modified to indicate the new ownership group of the data item. The control file is then modified to indicate that the owner set of the ownership group to which the data item was moved is now the owner set of the data item. This change atomically enables the target owner to access the data item. If the ownership group is in the middle of an ownership change, the control file is updated to indicate that the data item is in a "moving delayed" state.

Changing the ownership group to which a data item belongs may or may not cause the owner of the data item to change. If the owner set of the source ownership group is the same as the owner set of the transitioning ownership group, then the owner of the data item is not changed when the data item is moved from the source ownership group to the transitioning ownership group. On the other hand, if the owner set of the source ownership group is not the same as the owner set of the transitioning ownership group, then the owner of the data item is changed when the data item is moved from the source ownership group to the transitioning ownership group.

Specific Ownership Changes Conditions

According to one embodiment, techniques are provided to handle situations in which (1) an attempt is made to change the owner set of an ownership group when a data item that belongs to the ownership group is in the middle of being transferred to a different ownership group; and (2) an attempt is made to transfer a data item to a different ownership group when that destination ownership group is in the middle of having its owner set changed.

To detect these conditions, an embodiment of the invention provides within the control file one or more status flags for each data item (e.g. tablespace) that belongs to an ownership group. For example, a flag may be used to indicate whether the ownership group to which a data item belongs is in the process of being assigned a new owner. Similarly, a flag may indicate that a data item is in the process of being transferred to a different ownership group.

When an attempt is made to change the owner set of an ownership group, the ownership change mechanism inspects the status flags of the data items that belong to the ownership group to determine whether any data item that belongs to the ownership group is in the middle of being transferred to a different ownership group. If any data item that belongs to the ownership group is in the middle of being transferred to a different ownership group, then the attempt to change the owner set of the ownership group is aborted. If no data items that belong to the ownership group are in the middle of being transferred to a different ownership group, then the status flags of the data items that belong to the ownership group are set to indicate that the ownership of the ownership group to which the data items belong is in transition. A message is also sent to the various database servers to invalidate their cached versions of the control file. This ensures that they see the new values of the status flags.

When an attempt is made to transfer a data item to a different ownership group, the status flags of the data item are checked to determine whether the destination ownership group is in the middle of having its owner set changed. According to one embodiment, this check is performed after modifying the data dictionary to reflect the new ownership group of the data item, but before updating the control file to give the owner of the new ownership group access to the data item. If the ownership group to which the data item belongs is in the middle of having its owner set changed, then the status flags for the data item in the control file are set to indicate a "move delayed" condition. In addition, a database-wide "move delayed" flag is set to indicate that the database contains some data items that are in a move delayed state.

When the operation of transferring ownership of the transitioning ownership group is completed, the process performing the transfer updates the status flags to indicate that the ownership group is no longer in the process of an ownership transfer. In addition, the process clears the "move delayed" flags of any data items that have moved to this ownership group during the ownership transfer of this ownership group.

Failure Recovery

It is possible for a failure to occur while an ownership change is in progress. The failure may be the result of a "process death" or a "server death". A process death occurs when a particular process involved in the ownership change fails. A server death occurs when an entire database server fails. With both of these failure types, all of the changes that have not yet been stored on persistent storage may be lost. After such a failure, it is necessary to return the database to a consistent state.

According to one embodiment of the invention, recovery from process death is performed through the use of a state object. A state object is a data structure that is allocated in a memory region associated with the database server to which the process belongs. Prior to performing an action, the process updates the state object to indicate the action it is going to perform. If the process dies, another process within the database server (e.g. a "process monitor") invokes a method of the state object (a "clean up routine") to return the database to a consistent state.

The specific acts performed to clean up after a process failure depend on what operation the dead process was performing, and how far the dead process had executed before it died. According to one embodiment, process failures during an ownership change of an ownership group are handled as follows:

If the process performing the ownership change dies before it makes the final control file change, then the original owner is restored as the owner of the ownership group.

If the process performing the ownership change dies after it makes the final control file change but before it deletes the state object, then the new owner remains the owner, and the state object is deleted.

Process failures that occur while transferring a data item from one ownership group to another are handled as follows:

If the process performing the transfer dies before the change to the data dictionary, then the original owner of the data item will be restored as the owner of the data item.

If the process performing the transfer dies after the changes to the dictionary have been committed, but before the final control file change, then the process monitor completes the move and performs the appropriate change to the control file. If the ownership group is in the middle of an ownership change, the data items are marked as "move delayed".

If the process performing the transfer dies after the final control file change but before the state object is deleted, the process monitor will delete the state object.

Server Death

While a database server is dead, no access is provided to the data in the ownership groups that were owned exclusively by the dead server. Therefore, according to one embodiment of the invention, server death is an event that triggers an automatic ownership change, where all ownership groups exclusively owned by the failed server are assigned to new owners.

The specific acts performed to clean up after a server failure depend on what operation the database server was performing, and how much of an ownership transfer operation was performed before the server died. According to one embodiment, server failures during an ownership change of an ownership group are handled as follows:

If the source database server dies before the final control file change is made, then the ownership group is assigned to another thread, and the status information in the control file is updated to indicate that the ownership group is no longer in transition.

If the target database server dies, then either (1) the process performing the transition will detect that the instance died and abort the transition, or (2) during recovery of the dead server, the ownership group will be reassigned from the dead server to another server.

Server failures that occur while transferring a data item from one ownership group to another are handled as follows:

If the source server dies before the dictionary change, then during recovery of the server, new owners will be assigned to the source ownership group and the move flag of the data item will be cleared.

If the source server dies after the dictionary change but before the final control file change, then during the recovery of the source server, the move operation will be finished by either assigning the right owner to the data item, or by marking it as move delayed.

If the target server dies and the final control file change is made, then the data item is marked as "move delayed".

During the recovery of the dead server, the ownership of the transitioning ownership group will be reassigned and the move delayed flag will be cleared.

Reducing Downtime During Ownership Change

As described above, the steps illustrated in FIG. 4 represent one technique for changing the ownership of an ownership group. In this technique, step 402 requires the ownership change mechanism to wait until all transactions that made changes to data than belongs to the transitioning ownership group to either commit or roll back. During this wait, all data in the transitioning ownership group is unavailable. Therefore, it is important to minimize the duration of the wait.

As described above, it may not be practical to track which transactions actually made changes to data that belongs to the transitioning ownership group. Therefore, the ownership change mechanism waits for all transactions that are executing in all database servers that belong to the source owner set of the transitioning ownership group to either commit or roll back. Due to the number of transactions the ownership change mechanism must wait upon, many of which may not have even made changes to data from the transitioning ownership group, the delay may be significant.

According to an alternative embodiment, a mechanism is provided that allows the data that is being transitioned between owners to remain available during this delay. Specifically, a disable change message is not sent to all database servers. Rather, a "new owner" message is sent to all database servers indicating the target owner set of the ownership group. The new owner message may be broadcast, for example, by sending a refresh cache message to all database servers after updating the control file to indicate (1) the source owner set, (2) the target owner set, and (3) that the ownership group is in transition.

All transactions started by a server after the server receives the new owner message act as though the target owner set owns the ownership group. All transactions that started in a server before the server receives the new owner message continue to act as though the source owner set owns the ownership group. Thus, during the waiting period, ownership of the transitioning ownership group is effectively shared between the members of the source owner set and the members of the target owner set. In other words, the data of the transitioning ownership group is temporarily shared among two database servers and the shared disk locking mechanism is temporarily activated for access to such data.

When all of the transactions in the source owner set that were begun prior to the broadcast of the new owner message have either committed or rolled back, the control file is updated a second time. During the second update, the control file is updated to indicate that the target owner set is the exclusive owner set for the ownership group, and that the ownership group is no longer in transition.

Access-type Based Ownership

According to one embodiment of the invention, the membership of the owner set of an ownership group differs depending on the type of access being performed. For example, an ownership group may have one owner set for read accesses, and a different owner set for write accesses. Similarly, an ownership group may have one owner set for forward changes, and a different owner set for backward changes and reads.

According to one approach, the owner set of an ownership group for read accesses includes all of the available database servers, while the owner set for the same ownership group for write accesses is limited to a single database server. Thus, with respect to reads the ownership group is accessed as a shared disk ownership group, and with respect to writes the ownership group is accessed as a shared nothing ownership group.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for transitioning ownership of a data item, the method comprising the steps of:
   a) disabling access to the data item;
   b) waiting for all transactions that have made changes to the data item to either commit or abort;
   c) if any transactions that made changes to the data item abort, then removing all changes to the data item that were made before access to the data item was disabled by the transactions that abort;
   d) changing data that indicates ownership of the data item from a first owner to a second owner; and
   e) enabling access to the data item.

2. The method of claim 1 wherein the step of changing data that indicates ownership of the data item is performed as an atomic operation.

3. The method of claim 1 wherein:
   the data item belongs to an ownership group initially owned by said first owner; and
   the step of changing data that indicates ownership of the data item from a first owner to a second owner includes changing the owner of said ownership group from said first owner to said second owner.

4. The method of claim 1 wherein:
   the data item initially belongs to a first ownership group owned by said first owner; and
   the step of changing data that indicates ownership of the data item from a first owner to a second owner includes changing data that indicates the ownership group to which said data item belongs to reflect that said data item belongs to a second ownership group owned by said second owner.

5. The method of claim 3 further including the step of responding to a failure of a process that is performing said ownership transition by performing the steps of:
   determining whether the process failed before changing the data that indicates ownership of the ownership group;
   if the process failed before changing the data that indicates ownership of the ownership group, then restoring the first owner as owner of the ownership group; and
   if the process failed after changing the data that indicates ownership of the ownership group, then retaining the second owner as owner of the ownership group.

6. The method of claim 4 wherein:
   the step of changing the data that indicates the ownership group to which said data item belongs is performed by changing data in a first file;
   the method further includes the step of updating a second file to reflect that the data item belongs to the second ownership group before changing data in said first file.

7. The method of claim 6 further comprising the step of responding to a failure of a process that is performing said ownership transition by performing the steps of:
   determining whether the process performing the ownership transition died before the change to the second file;
   if the process performing the ownership transition died before the change to the second file, then restoring the data item as a member of said first ownership group;
   if the process performing the ownership transition died after the change to the second file but before the change to the first file, then completing the transition to said second ownership group by updating said first file.

8. The method of claim 6 further comprising the steps of:
   determining whether the second ownership group is undergoing an ownership change; and
   if the second ownership group is undergoing an ownership change, then marking the data item as move delayed.

9. The method of claim 2 wherein the atomic operation includes the steps of:
   maintaining a set of related blocks that includes a first block and a second block, the first block that storing data that indicates that the data item is owned by the first owner;
   maintaining at least one flag that corresponds to the set of related blocks, said at least one flag indicating that said first block is valid and that said second block is not valid;
   updating a second block to indicate that the data item is owned by said second owner; and
   updating said at least one flag to indicate that said first block is not valid and that said second block is valid.

10. A method for transitioning to a second owner set the ownership of a data item that is initially owned by a first owner set, the method comprising the steps of:
    informing a plurality of database servers that the data item is in the process of being transitioned from the first owner set to the second owner set;
    after informing said plurality of database servers, concurrently allowing both members of said first owner set and members of said second owner set to directly access said data item;
    detecting when all transactions that are accessing said data item through said first owner set have either committed or aborted;
    after detecting that all transactions that are accessing said data item through said first owner set have either committed or aborted, performing the steps of storing data that indicates that the second owner set is the exclusive owner of the data item; and
    allowing only members of said second owner set to directly access the data item.

11. The method of claim 10 wherein the step of allowing both members of said first owner set and members of said second owner set to directly access said data item includes the steps of:
    allowing processes executing in members of said first owner set that had accessed the data item before the step of informing to continue to directly access the data item after the step of informing; and
    causing all processes that begin after the step of informing to access the data item through members of said second owner set.

12. The method of claim 11 wherein the step of detecting when all transactions that are accessing said data item through said first owner set have either committed or aborted is performed by detecting when all transactions that began execution prior to the step of informing have either committed or aborted.

13. A computer-readable medium carrying instructions for transitioning ownership of a data item, the instructions including instructions for performing the steps of:
 a) disabling access to the data item;
 b) waiting for all transactions that have made changes to the data item to either commit or abort;
 c) if any transactions that made changes to the data item abort, then removing all changes to the data item that were made before access to the data item was disabled by the transactions that abort;
 d) changing data that indicates ownership of the data item from a first owner to a second owner; and
 e) enabling access to the data item.

14. The computer-readable medium of claim 13 wherein the step of changing data that indicates ownership of the data item is performed as an atomic operation.

15. The computer-readable medium of claim 13 wherein:
 the data item belongs to an ownership group initially owned by said first owner; and
 the step of changing data that indicates ownership of the data item from a first owner to a second owner includes changing the owner of said ownership group from said first owner to said second owner.

16. The computer-readable medium of claim 13 wherein:
 the data item initially belongs to a first ownership group owned by said first owner; and
 the step of changing data that indicates ownership of the data item from a first owner to a second owner includes changing data that indicates the ownership group to which said data item belongs to reflect that said data item belongs to a second ownership group owned by said second owner.

17. The computer-readable medium of claim 15 further including instructions for responding to a failure of a process that is performing said ownership transition by performing the steps of:
 determining whether the process failed before changing the data that indicates ownership of the ownership group;
 if the process failed before changing the data that indicates ownership of the ownership group, then restoring the first owner as owner of the ownership group; and
 if the process failed after changing the data that indicates ownership of the ownership group, then retaining the second owner as owner of the ownership group.

18. The computer-readable medium of claim 16 wherein:
 the step of changing the data that indicates the ownership group to which said data item belongs is performed by changing data in a first file;
 the computer-readable medium further includes instructions for performing the step of updating a second file to reflect that the data item belongs to the second ownership group before changing data in said first file.

19. The computer-readable medium of claim 18 further comprising instructions for performing the step of responding to a failure of a process that is performing said ownership transition by performing the steps of:
 determining whether the process performing the ownership transition died before the change to the second file;
 if the process performing the ownership transition died before the change to the second file, then restoring the data item as a member of said first ownership group;
 if the process performing the ownership transition died after the change to the second file but before the change to the first file, then completing the transition to said second ownership group by updating said first file.

20. The computer-readable medium of claim 18 further comprising instructions for performing the steps of:
 determining whether the second ownership group is undergoing an ownership change; and
 if the second ownership group is undergoing an ownership change, then marking the data item as move delayed.

21. The computer-readable medium of claim 14 wherein the atomic operation includes the steps of:
 maintaining a set of related blocks that includes a first block and a second block, the first block that storing data that indicates that the data item is owned by the first owner;
 maintaining at least one flag that corresponds to the set of related blocks, said at least one flag indicating that said first block is valid and that said second block is not valid;
 updating a second block to indicate that the data item is owned by said second owner; and
 updating said at least one flag to indicate that said first block is not valid and that said second block is valid.

22. A computer-readable medium carrying instructions for transitioning to a second owner set the ownership of a data item that is initially owned by a first owner set, the instructions including instruction for performing the steps of:
 informing a plurality of database servers that the data item is in the process of being transitioned from the first owner set to the second owner set;
 after informing said plurality of database servers, concurrently allowing both members of said first owner set and members of said second owner set to directly access said data item;
 detecting when all transactions that are accessing said data item through said first owner set have either committed or aborted;
 after detecting that all transactions that are accessing said data item through said first owner set have either committed or aborted, performing the steps of storing data that indicates that the second owner set is the exclusive owner of the data item; and
 allowing only members of said second owner set to directly access the data item.

23. The computer-readable medium of claim 22 wherein the step of allowing both members of said first owner set and members of said second owner set to directly access said data item includes the steps of:
 allowing processes executing in members of said first owner set that had accessed the data item before the step of informing to continue to directly access the data item after the step of informing; and
 causing all processes that begin after the step of informing to access the data item through members of said second owner set.

24. The computer-readable medium of claim 23 wherein the step of detecting when all transactions that are accessing said data item through said first owner set have either committed or aborted is performed by detecting when all transactions that began execution prior to the step of informing have either committed or aborted.

\* \* \* \* \*